(12) United States Patent
Jasim et al.

(10) Patent No.: US 9,847,642 B2
(45) Date of Patent: Dec. 19, 2017

(54) CONTROL CIRCUIT

(71) Applicant: ALSTOM Technology Ltd, Baden (CH)

(72) Inventors: Omar Fadhel Jasim, Nottingham (GB); Kevin J. Dyke, South Gloucestershire (GB); David Reginald Trainer, Derby (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 290 days.

(21) Appl. No.: 14/770,726

(22) PCT Filed: Dec. 2, 2013

(86) PCT No.: PCT/EP2013/075269
§ 371 (c)(1),
(2) Date: Aug. 26, 2015

(87) PCT Pub. No.: WO2014/131476
PCT Pub. Date: Sep. 4, 2014

(65) Prior Publication Data
US 2016/0013649 A1    Jan. 14, 2016

(30) Foreign Application Priority Data

Feb. 28, 2013 (EP) .................................... 13157323

(51) Int. Cl.
*H02J 3/36* (2006.01)
*H02M 1/34* (2007.01)
(Continued)

(52) U.S. Cl.
CPC ................. *H02J 3/36* (2013.01); *H02M 1/34* (2013.01); *H02M 5/458* (2013.01);
(Continued)

(58) Field of Classification Search
CPC ............. H02M 1/34; H02M 2001/344; H02M 2001/348; H02M 5/40; H02M 5/42;
(Continued)

(56) References Cited

U.S. PATENT DOCUMENTS 3,641,357 A    2/1972 Gratzmuller
2008/0197966 A1*  8/2008 Sommer .............. H03K 17/168
                                                  338/215

(Continued)

FOREIGN PATENT DOCUMENTS

CA     2615401        7/2009
EP     0 704 961 A1   4/1996
(Continued)

OTHER PUBLICATIONS

English-language machine translation of JP 03-089879, Fuji Electric Co Ltd (Sep. 18, 2000).
(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

One circuit includes first and second primary terminals for connection to first and second power transmission lines and a current transmission path extending between the primary terminals and having current transmission path portions separated by a third primary terminal. A first current transmission path portion includes at least one primary switching element connected in series between the first and third primary terminals, the second current transmission path portion includes an energy conversion block connected between the second and third primary terminals, and the energy conversion block includes at least one primary energy conversion element for removing energy from the
(Continued)

power transmission lines. The control circuit further includes a converter limb connected across the second and third primary terminals that includes an auxiliary converter. The control circuit further includes a control unit which controls the auxiliary converter to selectively provide a voltage source.

12 Claims, 6 Drawing Sheets

(51) Int. Cl.
*H02M 5/458* (2006.01)
*H02M 7/483* (2007.01)

(52) U.S. Cl.
CPC .. *H02J 2003/365* (2013.01); *H02M 2001/344* (2013.01); *H02M 2007/4835* (2013.01); *Y02E 60/60* (2013.01)

(58) Field of Classification Search
CPC .......... H02M 5/44; H02M 5/45; H02M 5/453; H02M 5/458; H02M 3/04; H02M 3/06; H02M 3/07; H02M 3/10; H02M 3/135; H02M 7/04; H02M 7/12; H02M 7/125; H02M 7/217; H02M 7/219; H02M 7/42; H02M 7/44; H02M 7/48; H02M 7/483; H02M 7/49; H02M 7/537; H02M 7/5387; H02M 7/5388; H02M 7/797; H02M 2007/4835; Y02E 60/60
See application file for complete search history.

(56) References Cited

U.S. PATENT DOCUMENTS

| | | |
|---|---|---|
| 2008/0197996 A1 | 8/2008 | Kumon |
| 2009/0295315 A1 | 12/2009 | Tarnow et al. |
| 2010/0096931 A1* | 4/2010 | Jahkonen ................ B66B 1/30 307/80 |
| 2011/0292687 A1* | 12/2011 | Barthold ................ H02M 3/07 363/15 |
| 2014/0146583 A1* | 5/2014 | Trainer .................... H02J 3/36 363/35 |
| 2015/0035364 A1* | 2/2015 | Davidson ............... H02H 7/268 307/36 |
| 2015/0349536 A1* | 12/2015 | Davidson ................ H02M 1/15 307/80 |
| 2017/0163170 A1* | 6/2017 | Tahata .................. H02M 7/155 |

FOREIGN PATENT DOCUMENTS

| | | |
|---|---|---|
| EP | 2 494 687 A1 | 9/2012 |
| EP | 2 750 271 A1 | 7/2014 |
| EP | 2 755 315 A1 | 7/2014 |
| EP | 2755317 A1 | 7/2014 |
| EP | 2 797 216 A1 | 10/2014 |
| GB | 1 200 945 A | 8/1970 |
| JP | 03-089879 A | 9/2000 |
| WO | WO-2010/088969 A1 | 8/2010 |
| WO | WO-2011/050847 A1 | 5/2011 |
| WO | WO-2011/127980 A1 | 10/2011 |
| WO | WO-2012/025142 A1 | 3/2012 |
| WO | WO-2013/000518 | 1/2013 |
| WO | WO-2013/068031 A1 | 5/2013 |
| WO | WO-2013/128148 A1 | 9/2013 |
| WO | WO-2014/102034 A1 | 7/2014 |
| WO | WO-2014/108225 A2 | 7/2014 |
| WO | WO-2014/108257 A2 | 7/2014 |
| WO | WO-2014/108258 A1 | 7/2014 |
| WO | WO-2014/173606 A1 | 10/2014 |

OTHER PUBLICATIONS

International Search Report and Written Opinion for Application No. PCT/EP2013/075269, dated Jul. 24, 2014, 6 pages.

* cited by examiner

CONTROL CIRCUIT

CROSS REFERENCE TO RELATED APPLICATIONS

The present application is a National Stage of International Application No. PCT/EP2013/075269, filed Dec. 2, 2013, which claims priority to European Application No. 13157323.0, filed Feb. 28, 2013, which is incorporated herein by reference in its entirety.

This invention relates to a control circuit.

In DC power transmission schemes, DC transmission lines $10a,10b$ are used to interconnect a transmitting electrical network 12 and a receiving electrical network 14 to permit transfer of power between the two electrical networks 12,14, as shown in FIG. 1a. In the event of a fault 16 preventing the receiving electrical network 14 from receiving power from the DC transmission lines $10a,10b$, the transmitting electrical network 12 cannot interrupt the transmission of power into the DC transmission lines $10a,10b$. This is because generators, such as wind turbines, cannot be switched off instantaneously and so will continue to feed energy 18 into the DC transmission lines $10a,10b$. Moreover, the receiving electrical network 14 may be required by a Grid Code to ride through a supply dip, e.g. where the voltage is reduced to approximately 15% of its original value, and to resume the transmission of power upon the removal of the fault 16.

Continuing to transmit power into the DC transmission lines $10a,10b$ results in an accumulation of excess power in the DC transmission lines $10a,10b$ which not only adversely affects the balance between the transmission and receipt of power by the respective electrical networks 12,14, but also might damage various components of the DC power transmission scheme, particularly as a result of high voltage stress caused by uncontrolled charging of the capacitance of the DC transmission lines $10a,10b$.

One solution for preventing the accumulation of excess power is to temporarily store the excess power in DC link capacitors and other capacitors forming part of the transmitting electrical network 12. The finite energy storage capability of the transmitting electrical network 12 however limits the amount of real power that may be temporarily stored away until the receiving electrical network 14 returns to its working state.

Another solution for preventing the accumulation of excess power is the use of a load dump chopper circuit 20 to divert the excess power away from the DC transmission lines $10a,10b$. FIG. 1b shows a dump resistor 22 connected in series with a switch across the DC transmission lines $10a$, $10b$. Closing the switch causes current to flow from the DC transmission lines through the dump resistor 22, which in turn causes power to dissipate via the dump resistor 22. This allows excess energy to be removed from the DC transmission lines $10a,10b$ via the load dump chopper circuit 20.

Existing chopper circuits utilise a simple semiconductor switch to connect a resistor between the DC transmission lines in order to absorb excess energy. This type of chopper relies on the series connection and simultaneous switching of a large number of lower voltage semiconductor switches which are operated in a pulse width modulation (PWM) manner to accurately control the energy absorption. The design and operation of such a chopper circuit switch requires large passive devices and complex control methods to ensure equal sharing of the total applied voltage between the individual semiconductor switches. In addition, the PWM action leads to very high rates of change of voltage and current within the chopper circuit and DC transmission lines which leads to undesirable electrical spikes and a high level of electromagnetic noise and interference.

According to an aspect of the invention, there is provided a control circuit comprising:
 first and second primary terminals for respective connection to first and second power transmission lines;
 a current transmission path extending between the first and second primary terminals and having first and second current transmission path portions separated by a third primary terminal, the first current transmission path portion including at least one primary switching element connected in series between the first and third primary terminals, the second current transmission path portion including an energy conversion block connected between the second and third primary terminals, the energy conversion block including at least one primary energy conversion element for removing energy from the power transmission lines;
 a converter limb connected across the second and third primary terminals, the converter limb including an auxiliary converter; and
 a control unit which controls the auxiliary converter to selectively provide a voltage source to minimise a voltage across the or each primary switching element prior to switching of the or each primary switching element.

To regulate the energy levels in the power transmission lines, the control circuit may be configured to adopt a standby configuration in which the or each primary switching element is switched off to switch the first current transmission path portion out of circuit to block current from flowing from the power transmission lines through the current transmission path during normal conditions of the power transmission lines, or an energy removal configuration in which the or each primary switching element is switched on to switch the first current transmission path portion into circuit to cause current to flow from the power transmission lines through the current transmission path and into the or each energy conversion element so as to enable excess energy to be removed from the power transmission lines and dissipated via the or each energy conversion element.

The inclusion of the converter limb in the control circuit means that modification of the respective voltages across the first and second current transmission path portions can be carried out through control of the auxiliary converter to selectively provide a voltage source. This in turns means that the respective voltages across the first and second current transmission path portions can be actively modified in order to control the voltage experienced by the or each primary switching element of the first current transmission path portion. It will be understood that the voltage source selectively provided by the auxiliary converter may be a zero voltage source, i.e. a short circuit, or a non-zero voltage source.

In this manner the voltage experienced by the or each primary switching element may be modified to permit the or each primary switching element to be switched at zero or near-zero voltage. Such switching, which is known as soft-switching, reduces the rates of change of voltage and current for the or each primary switching element, thus reducing switching losses and electromagnetic interference for the or each primary switching element.

In addition, the connection of the converter limb across the second current transmission path portion means that, in the standby configuration of the control circuit, the converter limb is switched out of circuit with the power transmission lines and so current does not flow from the power transmission lines and through the converter limb. Since the period in which the control circuit is in its standby configuration is typically much longer than the period in which the control circuit is in its energy removal configuration, switching the converter limb out of circuit with the power transmission lines in the standby configuration of the control circuit improves the efficiency of the control circuit from an energy and operating cost perspective.

The inclusion of the converter limb in the control circuit according to the invention therefore results in an economical and space-saving control circuit which is capable of selectively removing energy from the power transmission lines with reduced switching losses and electromagnetic interference.

In embodiments of the invention, the first current transmission path portion may include a plurality of primary switching elements connected in series between the first and third primary terminals. In such a configuration of the first current transmission path portion, soft-switching simplifies voltage sharing among the plurality of series-connected primary switching elements. This advantageously reduces or eliminates the need for large voltage grading snubber circuitry. In contrast, omission of the converter limb from the control circuit would require the use of the large voltage grading snubber circuitry to ensure proper voltage sharing among the plurality of series-connected primary switching elements, thus adding size, weight and cost to the control circuit.

In further embodiments of the invention, the auxiliary converter may further include at least one secondary switching element. The or each secondary switching element may be switchable to selectively control the auxiliary converter to provide a voltage source or block the auxiliary converter from providing a voltage source. This enables the voltage source provided by the auxiliary converter to be readily switched out of circuit, when the voltage source is not required, to ensure commutation of the majority of the current in the control circuit to the second current transmission path portion. Therefore, it becomes straightforward to design and optimise the control circuit since it would not be required to consider the effect of the auxiliary converter providing a voltage source at times when the voltage source is not required.

In still further embodiments of the invention, the auxiliary converter may include at least one energy storage device for storing and releasing energy. In such embodiments, the or each energy storage device is employed by the auxiliary converter to provide a voltage source. The or each energy storage device may be a capacitor, battery, fuel cell or any device which is capable of storing and releasing energy.

In such embodiments, the auxiliary converter may be a chain-link converter. The chain-link converter may include a plurality of series-connected modules. Each module may include at least one secondary switching element and at least one energy storage device, the or each secondary switching element and the or each energy storage device in each module combining to selectively provide a voltage source.

The structure of the chain-link converter permits build up of a combined voltage across the chain-link converter, which is higher than the voltage available from each of its individual modules, via the insertion of the energy storage devices of multiple modules, each providing its own voltage, into the chain-link converter. In this manner switching of the or each secondary switching element in each module causes the chain-link converter to provide a stepped variable voltage source, which permits the generation of a voltage waveform across the chain-link converter using a step-wise approximation. As such the chain-link converter is capable of providing a wide range of voltages.

The converter limb may further include a inductive element connected in series with the auxiliary converter. The inclusion of the inductive element in the converter limb provides control over the flow of current in the converter limb when current flows in the converter limb, e.g. when the auxiliary converter is controlled to provide a voltage source, thus improving the reliability of the control circuit.

The number of primary switching elements in the first current transmission path portion may vary depending on the required voltage and current ratings of the control circuit.

Each switching element may include an active switching device in the form of a semiconductor device. The semiconductor device may be, but is not limited to, an insulated gate bipolar transistor, a gate turn-off thyristor, a field effect transistor, an injection-enhanced gate transistor or an integrated gate commutated thyristor.

Furthermore the configuration of each switching element may vary depending on the required voltage and current ratings of the control circuit. For example, at least one switching element may include an active switching device connected in parallel with an anti-parallel passive switching device. A passive switching device may be, for example, a diode.

In embodiments of the invention, the control unit may control the auxiliary converter to provide a variable voltage source in a ramping mode to ramp up or down a voltage across the second current transmission path portion.

The operation of the auxiliary converter to provide a variable voltage source in the ramping mode enables gradual ramp-up or ramp-down of the voltage across the second current transmission path portion, thus providing reliable control over the change in voltage in the control circuit during its operation.

In embodiments of the invention employing the use of at least one secondary switching element being switchable to selectively control the auxiliary converter to provide a voltage source or block the auxiliary converter from providing a voltage source, the control unit may control the switching of at least one secondary switching element of the auxiliary converter in a blocking mode to block the auxiliary converter from providing a voltage source while the or each primary switching element is switched to switch the first current transmission path portion into circuit. As mentioned above, the voltage source provided by the auxiliary converter can be readily switched out of circuit, when the voltage source is not required, to ensure commutation of the majority of the current in the control circuit to the second current transmission path portion. This allows the majority of the current from the power transmission lines to flow through the second current transmission path portion and thereby enables efficient removal of energy from the power transmission lines.

In still further embodiments of the invention, the control unit may control the auxiliary converter to provide a zero voltage source in a bypass mode to permit current to flow in the converter limb while the first current transmission path portion is switched out of circuit. In this manner the auxiliary converter does not provide a voltage source which would cause current to flow in the control circuit in its standby configuration. This further improves the efficiency of the control circuit from an energy and operating cost perspective. In contrast, allowing the auxiliary converter to provide a voltage source and thereby cause current to flow in the control circuit in its standby configuration results in unnecessary expenditure of energy, thereby reducing the energy and operating cost efficiency of the control circuit.

When the converter limb includes an inductive element connected in series with the auxiliary converter, any residual energy stored in the inductive element will be dissipated via the or each energy conversion element after the auxiliary converter is controlled to provide a zero voltage source in the aforementioned bypass mode. This causes a temporary circulation of current in the second current transmission path portion and converter limb. Once the residual energy has been fully dissipated, the circulation of current in the control circuit ceases.

In embodiments of the invention employing the use of at least one energy storage device, the control unit may control the auxiliary converter to selectively charge or discharge at least one energy storage device when current flows in the converter limb.

During the operation of the control circuit, the or each energy storage device in the auxiliary converter may charge and discharge as a result of current flowing in the converter limb. Selective charging or discharging of the or each energy storage device enables the or each energy storage device to be maintained within a predefined voltage range or at a predefined voltage level to ensure reliable operation of the control circuit. Furthermore, maintaining the or each energy storage device within a predefined voltage range or at a predefined voltage level removes the need to take into consideration any variation in voltage level of the or each energy storage device when it comes to controlling the auxiliary converter to provide a voltage source, thus simplifying the control scheme for the auxiliary converter.

In such embodiments of the invention, the auxiliary converter may include at least one secondary switching element, and the control unit may control the switching of the or each secondary switching element of the auxiliary converter to selectively charge or discharge at least one energy storage device when current flows in the converter limb.

In embodiments of the invention in which the auxiliary converter includes at least one energy storage device, the or each energy storage device may be in a pre-charged state during the operation of the control circuit in its standby configuration In other embodiments of the invention in which the auxiliary converter includes at least one energy storage device, the or each energy storage device may be in an uncharged state during the operation of the control circuit in its standby configuration. As such any uncharged energy storage device must be charged before it can be employed by the auxiliary converter to provide a voltage source.

The or each energy storage device may be charged using leakage current flowing through snubber circuits and/or control electronics associated with the or each switching element in the control circuit.

In embodiments of the invention employing the use of at least one energy storage device, the control circuit may further include a charging circuit. The charging circuit may have first and second auxiliary terminals, the first auxiliary terminal being connectable to the first power transmission line, the second auxiliary terminal being connected to the auxiliary converter. The charging circuit may include at least one auxiliary switching element, the or each auxiliary switching element being switchable to cause a current to flow between the first and second power transmission lines via the auxiliary converter to charge the or each energy storage device.

The inclusion of the charging circuit in the control circuit enables charging of the or each energy storage device using current from the power transmission lines even when the first current transmission path portion is switched out of circuit. Using current from the power transmission lines obviates the need for a separate energy source to charge the or each energy storage device. The addition of a separate energy source to the control circuit would have increased the size, weight and cost to the control circuit and thereby adversely affect the energy and cost efficiency of the control circuit.

In addition the inclusion of the charging circuit in the control circuit provides direct control over the charging of the or each energy storage device prior to its use by the auxiliary converter in providing a voltage source, thus improving the reliability of the control circuit. Otherwise omission of the charging circuit from the control circuit could result in the or each energy storage device being in an either uncharged or partially charged state, which in turn could hinder the auxiliary converter from providing a voltage source with a required voltage range or level.

The charging circuit may include a resistive element with a higher resistance than the energy conversion block. The provision of such a resistive element in the charging circuit prevents the flow of high current in the control circuit when the or each auxiliary switching element is switched to cause a current to flow between the first and second power transmission lines via the auxiliary converter to charge the or each energy storage device.

In embodiments employing the use of at least one energy storage device and an inductive element, the second auxiliary terminal may be connected to a junction between the inductive element and the auxiliary converter such that a branch is formed between the third primary terminal and the second auxiliary terminal, the branch including the inductive element. In this manner the inductive element separates the charging circuit and the current transmission path, and so the inductive element provides control over the flow of current in the current transmission path when the or each auxiliary switching element is switched to cause a current to flow between the first and second power transmission lines via the auxiliary converter to charge the or each energy storage device.

Preferred embodiments of the invention will now be described, by way of example only, with reference to the accompanying drawings in which.

Figure 2:
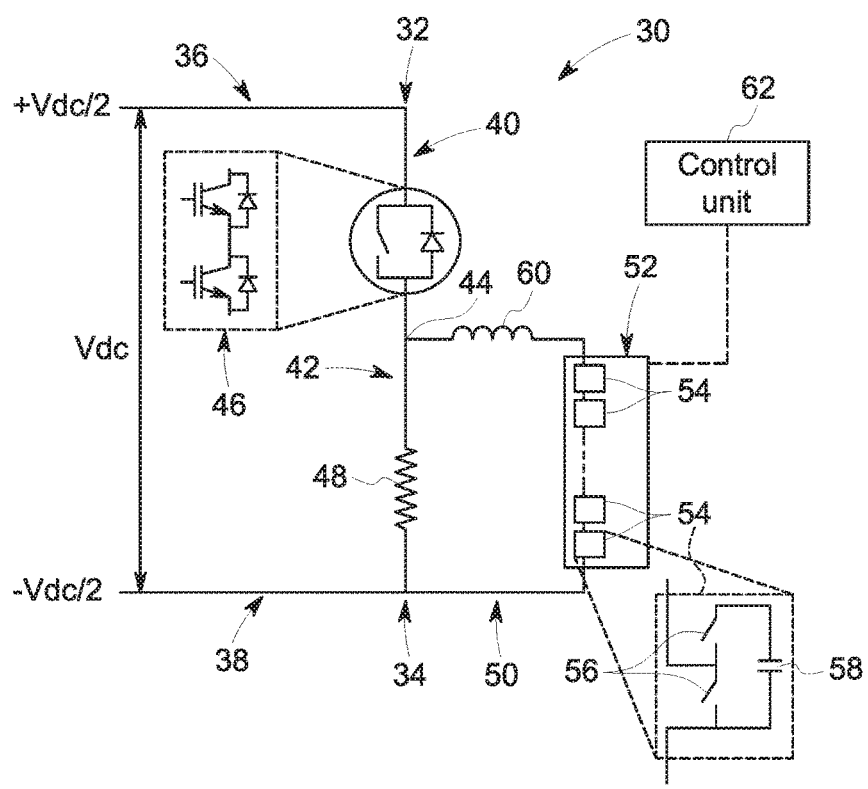
FIG. 2 shows, in schematic form, a control circuit according to a first embodiment of the invention.

A first control circuit 30 according to a first embodiment of the invention is shown in FIG. 2.

The first control circuit 30 comprises first and second primary terminals 32,34. In use, the first and second primary terminals 32,34 are respectively connected to first and second DC power transmission lines 36,38 respectively carrying a voltage of +Vdc/2 and −Vdc/2.

The first control circuit 30 further includes a current transmission path extending between the first and second primary terminals 32,34. The current transmission path has first and second current transmission path portions 40,42 separated by a third primary terminal 44.

The first current transmission path portion 40 extends between the first and third primary terminals 32,44, and includes a plurality of series-connected primary switching elements 46. Each primary switching element 46 is constituted by a semiconductor device in the form of an insulated gate bipolar transistor (IGBT) which is connected in parallel with an anti-parallel diode.

In use, the plurality of series-connected primary switching elements 46 are switchable to selectively switch the first current transmission path portion 40 into and out of circuit with the first and second DC power transmission lines 36,38 and other components of the first control circuit 30.

The number of primary switching elements 46 in the first current transmission path portion 40 may vary depending on the required voltage and current ratings of the first control circuit 30.

The second current transmission path portion 42 extends between the second and third primary terminals 34,44, and includes an energy conversion block. The energy conversion block includes a primary energy conversion element in the form of a dump resistor 48. The dump resistor 48 is connected in series between the second and third primary terminals 34,44. It is envisaged that, in other embodiments of the invention, the dump resistor 48 may be replaced by a plurality of dump resistors.

The first control circuit 30 further includes a converter limb 50 connected across the second and third primary terminals. The converter limb 50 includes an auxiliary converter in the form of a chain-link converter 52.

The chain-link converter 52 includes a plurality of series-connected modules 54. Each module 54 includes a pair of secondary switching elements 56 and an energy storage device in the form of a capacitor 58. The secondary switching elements 56 are connected in parallel with the capacitor 58 in a half-bridge arrangement to define a 2-quadrant unipolar module 54 that can provide zero or positive voltage and can conduct current in two directions.

Each secondary switching element 56 is constituted by a semiconductor device in the form of an IGBT which is connected in parallel with an anti-parallel diode.

The capacitor 58 of each module 54 is selectively bypassed or inserted into the chain-link converter 52 by changing the state of the secondary switching elements 56. This selectively directs current through the capacitor 58 or causes current to bypass the capacitor 58, so that each module 54 provides a zero or positive voltage.

The capacitor 58 of each module 54 is bypassed when the pair of secondary switching elements 56 in each module 54 is configured to form a short circuit in the module 54. This causes current in the chain-link converter 52 to pass through the short circuit and bypass the capacitor 58, and so the module 54 provides a zero voltage, i.e. the module 54 is configured in a bypassed mode.

The capacitor 58 of each module 54 is inserted into the chain-link converter 52 when the pair of secondary switching elements 56 in each module 54 is configured to allow the current in the chain-link converter 52 to flow into and out of the capacitor 58. The capacitor 58 then charges or discharges its stored energy so as to provide a positive voltage, i.e. the module 54 is configured in a non-bypassed mode.

It is possible to build up a combined voltage across the chain-link converter 52, which is higher than the voltage available from each of its individual modules 54, via the insertion of the capacitors 58 of multiple modules 54, each providing its own voltage, into the chain-link converter 52.

In this manner switching of the secondary switching elements 56 of each module 54 causes the chain-link converter 52 to provide a stepped variable voltage source, which permits the generation of a voltage waveform across the chain-link converter 52 using a step-wise approximation.

Also, the secondary switching elements 56 in each module 54 of the chain-link converter 52 can be configured to turn off the corresponding IGBTs to selectively block the chain-link converter 52 from providing a voltage source.

The converter limb 50 further includes an inductive element connected in series with the chain-link converter 52. The inductive element is in the form of a reactor 60. The inclusion of the reactor 60 in the converter limb 50 provides control over the flow of current in the converter limb 50 when current flows in the converter limb 50.

The first control circuit 30 further includes a control unit 62 to control the switching of the secondary switching elements 56 in each module 54 of the chain-link converter 52.

The operation of the first control circuit 30 of FIG. 2 is described as follows, with reference to FIGS. 3a to 3d and 4.

Figure 1A:
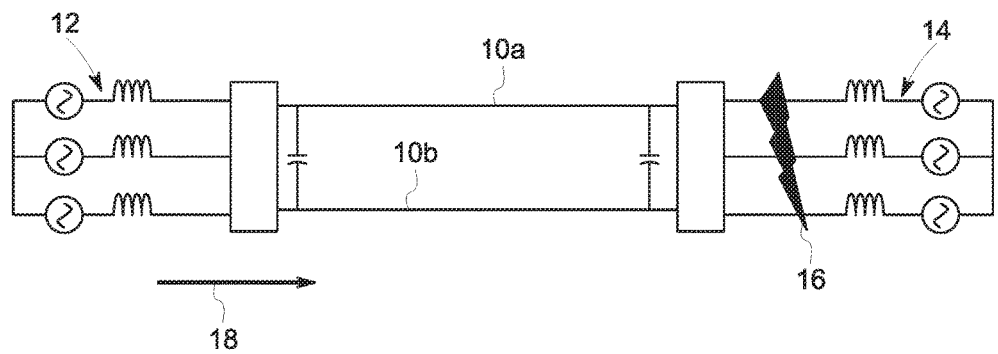
FIGS. 1a and 1b show, in schematic form, prior art DC transmission schemes.
Figure 1B:
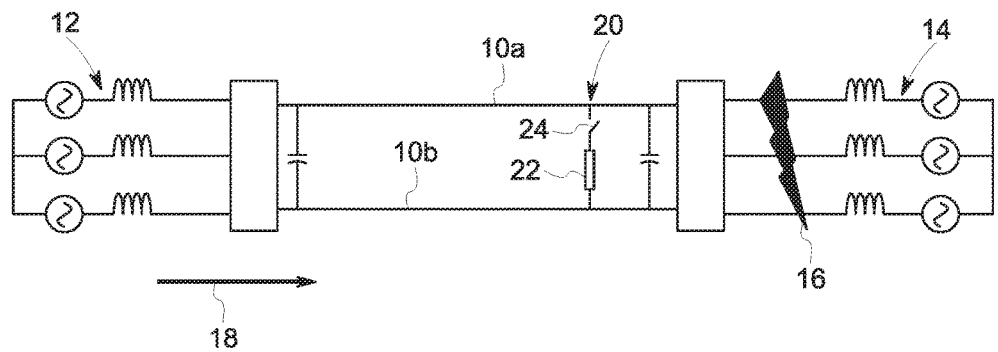
Figure 4:
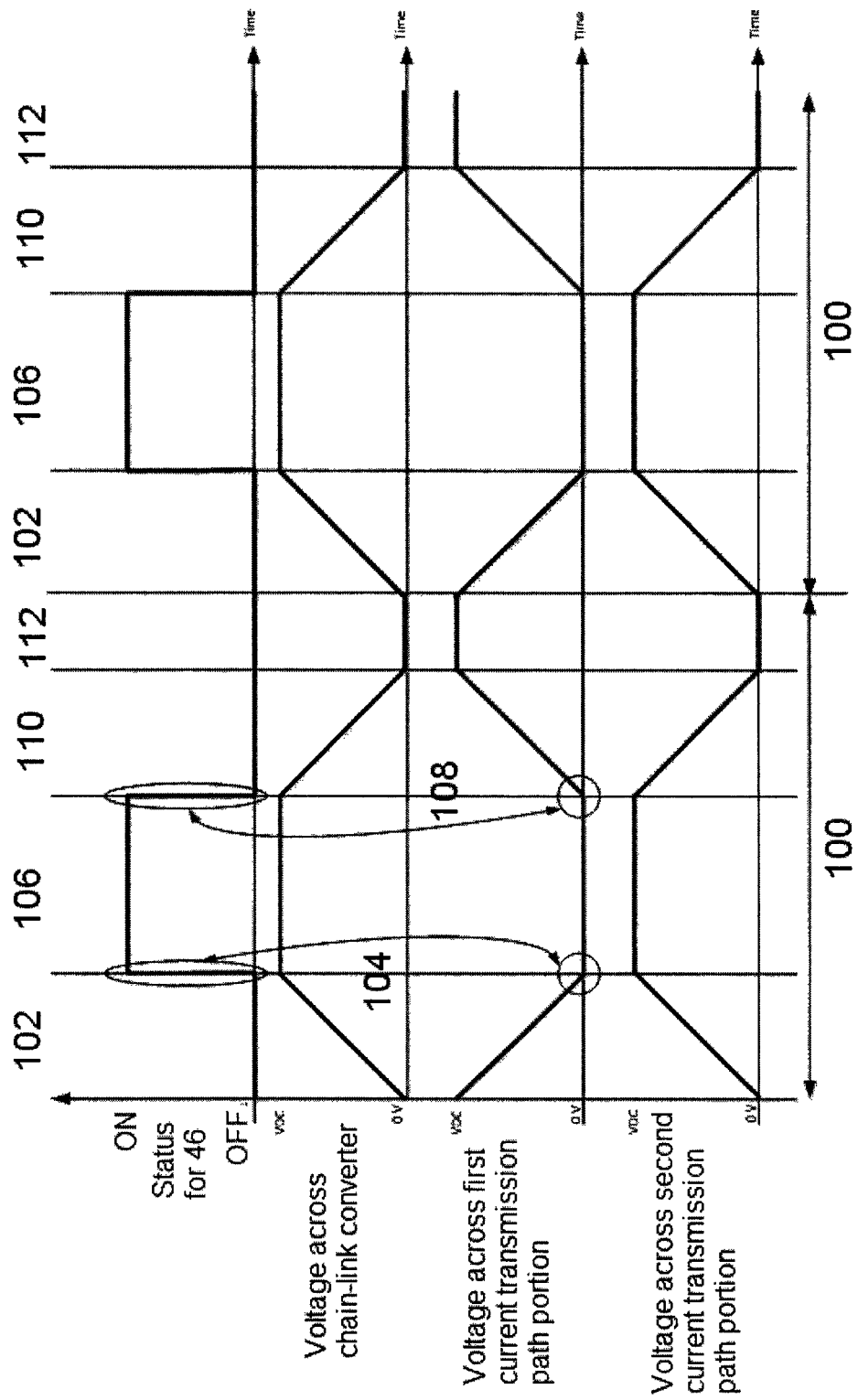
FIG. 4 illustrates, in graph form, the changes in voltage in the control circuit of FIG. 1 during its operation.

FIG. 4 illustrates, in graph form, the changes in voltage across the plurality of series-connected primary switching elements 46, the dump resistor 48 and the chain-link converter 52 during a single switching cycle 100 of the first control circuit 30 of FIG. 1.

The first and second DC power transmission lines 36,38 interconnect first and second power converters that are themselves connected to respective phases of corresponding first and second AC networks (not shown). Power is transmitted from the first AC network to the second AC network via the corresponding power converters and the first and second DC power transmission lines 36,38.

During normal conditions of the first and second DC power transmission lines 36,38, the first control circuit 30 adopts a standby configuration in which each primary switching element 46 is switched off to switch the first current transmission path portion 40 out of circuit to block current from flowing from the DC power transmission lines 36,38 through the current transmission path. Meanwhile the control unit 62 switches the secondary switching elements 56 in each module 54 of the chain-link converter 52 to configure each module 54 in a bypassed mode, and so the control unit 62 controls the auxiliary converter to provide a zero voltage source in a bypass mode. The provision of a zero voltage source by the auxiliary converter allows current to flow in the converter limb 50. However, at this stage current does not flow in the converter limb 50 as a consequence of the first current transmission path portion 40 being switched out of circuit and the capacitors 58 in the chain-link converter 52 being bypassed, and so there is zero current flowing through the current transmission path.

In the event that the second power converter is unable to receive the transmitted power as a result of, for example, a fault in the second AC network, the first AC network must temporarily continue transmitting power into the DC transmission lines until the DC power transfer can be reduced to zero, which is typically 1-2 seconds for a wind generation plant. This may lead to accumulation of excess energy in the DC power transmission lines 36,38. Removal of the excess energy from the DC power transmission lines 36,38 is required in order to protect the DC power transmission lines 36,38 from an overvoltage and to ensure a low voltage fault ride-through, if necessary.

Figure 3A:
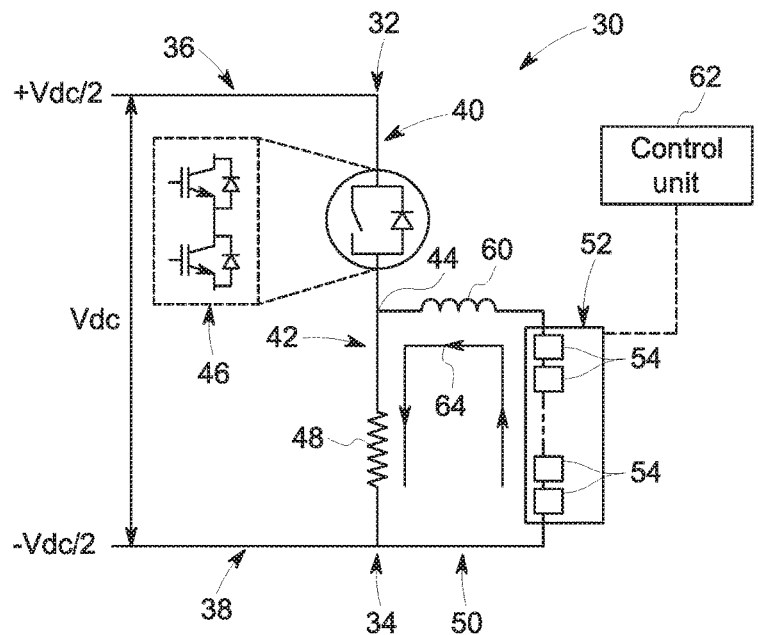
FIGS. 3a to 3d illustrate, in schematic form, the operation of the control circuit.

In order to allow the first AC network to continue transmitting power into the DC transmission lines via the first power converter, the control unit 62 controls the switching of the secondary switching elements 56 in each module 54 of the chain-link converter 52 to provide a variable voltage source in a first ramping mode 102 to ramp up the voltage across the second current transmission path portion 42 from zero voltage to Vdc using a step-wise approximation. During the first ramping mode, the inserted capacitors 58 of the chain-link converter 52 are discharged, and so a current 64 flows in the converter limb 50 and second current transmission path portion 42, as shown in FIG. 3*a*.

Once the voltage across the second current transmission path portion 42 reaches Vdc, the voltage across the first current transmission path portion 40 drops to zero voltage, and so the voltage experienced by each of the plurality of series-connected primary switching elements 46 drops to zero voltage. The plurality of series-connected primary switching elements 46 is then switched on 104 at zero voltage.

Figure 3B:
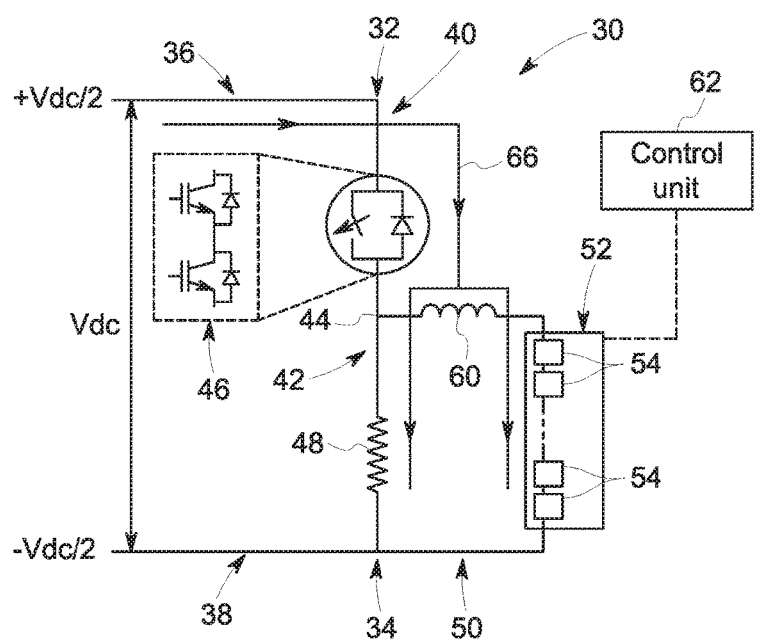

Switching on the plurality of series-connected primary switching elements 46 causes the first current transmission path portion 40 to be switched into circuit with the first and second DC power transmission lines 36,38 and other components of the first control circuit 30. This causes current 66 to flow from the first and second DC power transmission lines 36,38 through the current transmission path and into the dump resistor 48, and thereby permits energy dissipation via the dump resistor 48 so as to remove excess energy from the first and second DC power transmission lines 36,38, as shown in FIG. 3*b*. At this stage the voltage across the dump resistor 48 is equal to Vdc.

Meanwhile, after the plurality of series-connected primary switching elements 46 are switched on, the control unit 62 controls the switching of the secondary switching elements 56 in each module 54 of the chain-link converter 52 in a blocking mode 106 to block the chain-link converter 52 from providing a voltage source. This ensures commutation of the majority of the current 66 in the first control circuit 30 to the second current transmission path portion 42. At this stage the voltage across the chain-link converter is also equal to Vdc.

Part of the current 66 from the DC power transmission lines 36,38 flows through the anti-parallel diodes in the modules 54 of the chain-link converter 52 and charges the capacitors 58 in the modules 54 of the chain-link converter 52, as shown in FIG. 3*b*. Such charging can occur when all or some of the capacitors 58 have previously discharged and decreased their voltage.

After a required amount of energy has been removed from the DC power transmission lines 36,38 and the DC power transmission lines 36,38 has returned to normal conditions, the first control circuit 30 is operated to return to its standby configuration. Initially the control unit 62 controls the switching of the secondary switching elements 56 in each module 54 of the chain-link converter 52 to provide a voltage of Vdc across the second transmission current path portion. The voltage across the first current transmission path portion 40 is therefore at zero voltage, and so the voltage experienced by each of the plurality of series-connected primary switching elements 46 is therefore at zero voltage. The plurality of series-connected primary switching elements 46 is then switched off 108 at zero voltage.

Switching off the plurality of series-connected primary switching elements 46 causes the first current transmission path portion 40 to be switched out of circuit with the first and second DC power transmission lines 36,38 and other components of the first control circuit 30. This in turn inhibits current from flowing from the first and second DC power transmission lines 36,38 through the current transmission path and into the dump resistor 48.

Figure 3C:
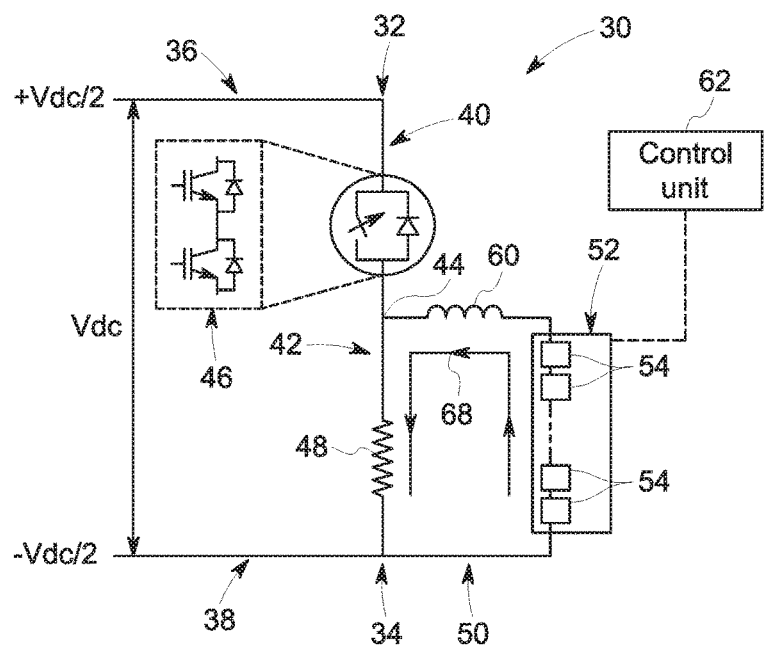

Thereafter, the control unit 62 controls the switching of the secondary switching elements 56 in each module 54 of the chain-link converter 52 to provide a variable voltage source in a second ramping mode 110 to ramp down the voltage across the second current transmission path portion 42 from Vdc to zero voltage using a step-wise approximation. During the second ramping mode, the inserted capacitors 58 of the chain-link converter 52 are discharged, and so a current 68 flows in the converter limb 50 and second current transmission path portion 42, as shown in FIG. 3*c*.

Once the voltage across the second current transmission path portion 42 reaches zero voltage, the control unit 62 switches the secondary switching elements 56 in each module 54 of the chain-link converter 52 to configure each module 54 in a bypassed mode, and so the control unit 62 controls the auxiliary converter to provide a zero voltage source in a bypass mode. In this manner the chain-link converter 52 does not provide a voltage source which would cause current to flow in the first control circuit 30 in its standby configuration.

Any residual energy stored in the reactor 60 causes a temporary circulation of current to flow in the second current transmission path portion 42 and converter limb 50. In this manner any residual energy stored in the reactor 60 is dissipated via the dump resistor 48. Once the residual energy has been fully dissipated, the circulation of current in the control circuit ceases.

Figure 3D:
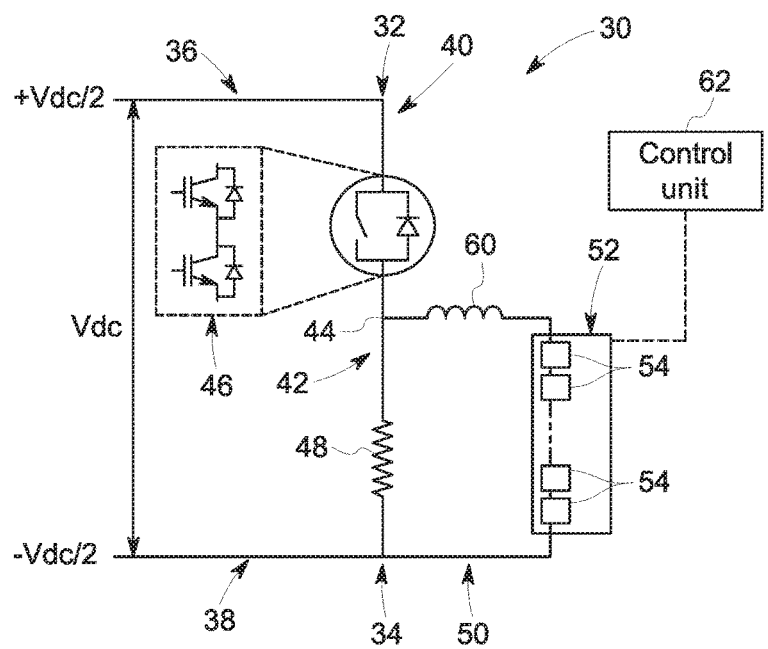

Hence, the first control circuit 30 returns to its standby configuration 112, as shown in FIG. 3*d*.

The first control circuit 30 is therefore capable of selectively removing excess energy from the DC power transmission lines 36,38 for dissipation via the dump resistor 48.

Switching on or off 104,108 the plurality of series-connected primary switching elements 46 at zero voltage, i.e. soft switching of the plurality of series-connected primary switching elements 46, reduces the rates of change of voltage and current for the plurality of series-connected primary switching elements 46, thus reducing switching losses and electromagnetic interference for the plurality of series-connected primary switching elements 46.

Moreover, soft-switching simplifies voltage sharing among the plurality of series-connected primary switching elements 46. This advantageously reduces or eliminates the need for large voltage grading snubber circuitry. In contrast, omission of the converter limb 50 from the first control circuit 30 would require the use of the large voltage grading snubber circuitry to ensure proper voltage sharing among the plurality of series-connected primary switching elements 46, thus adding size, weight and cost to the first control circuit 30.

In addition, the connection of the converter limb 50 across the second current transmission path portion 42 means that, in the standby configuration of the first control circuit 30, the converter limb 50 is switched out of circuit with the DC power transmission lines 36,38 and so current does not flow from the DC power transmission lines 36,38 and through the converter limb 50. Since the period in which the first control circuit 30 is in its standby configuration is typically much longer than the period in which the first control circuit 30 is in its energy removal configuration, switching the converter limb 50 out of circuit with the DC power transmission lines 36,38 in the standby configuration of the first control circuit 30 improves the efficiency of the first control circuit 30 from an energy and operating cost perspective.

The inclusion of the converter limb 50 in the first control circuit 30 according to the invention therefore results in an economical and space-saving control circuit which is capable of selectively removing energy from the DC power transmission lines 36,38 with reduced switching losses and electromagnetic interference.

Moreover the operation of the chain-link converter 52 to provide a variable voltage source in the first and second ramping modes 102,110 enables gradual ramp-up or ramp-down of the voltage across the second current transmission path portion 42, thus providing reliable control over the change in voltage in the first control circuit 30 during its operation.

Furthermore the charging and discharging of each capacitor 58 during the operation of the first control circuit 30 enables the capacitor 58 to be maintained within a predefined voltage range or at a predefined voltage level to ensure reliable operation of the control circuit. Furthermore, maintaining each capacitor 58 within a predefined voltage range or at a predefined voltage level removes the need to take into consideration any variation in voltage level of each capacitor 58 when it comes to controlling the chain-link converter 52 to provide a voltage source, thus simplifying the control scheme for the chain-link converter 52.

It is envisaged that, in other embodiments of the invention, the capacitor 58 may be replaced by another energy storage device that is capable of storing or releasing energy, e.g. a battery or fuel cell.

It is also envisaged that, in other embodiments of the invention, each IGBT may be replaced by another type of active switching device, while each diode may be replaced by another type of passive switching device.

It is further envisaged that, in other embodiments, each 2-quadrant unipolar module 54 may be replaced by another module including at least one secondary switching element and at least one energy storage device, the or each secondary switching element and the or each energy storage device in each module combining to selectively provide a voltage source.

The operation of the first control circuit 30 of FIG. 2 was described on the assumption that each capacitor 58 in the chain-link converter 52 is in a pre-charged state during the operation of the control circuit in its standby configuration. In practice, however, each capacitor 58 in the chain-link converter 52 may be in an uncharged state during the operation of the control circuit in its standby configuration. As such any uncharged capacitor 58 must be charged before it can be employed by the chain-link converter 52 to provide a voltage source.

Each capacitor 58 in the chain-link converter 52 may be charged using leakage current flowing through snubber circuits and/or control electronics associated with each switching element in the first control circuit 30. However, depending on the required voltage rating of the chain-link converter 52, the leakage current may be insufficient to charge each capacitor 58 in the chain-link converter 52 to the required voltage range or level.

Figure 5:
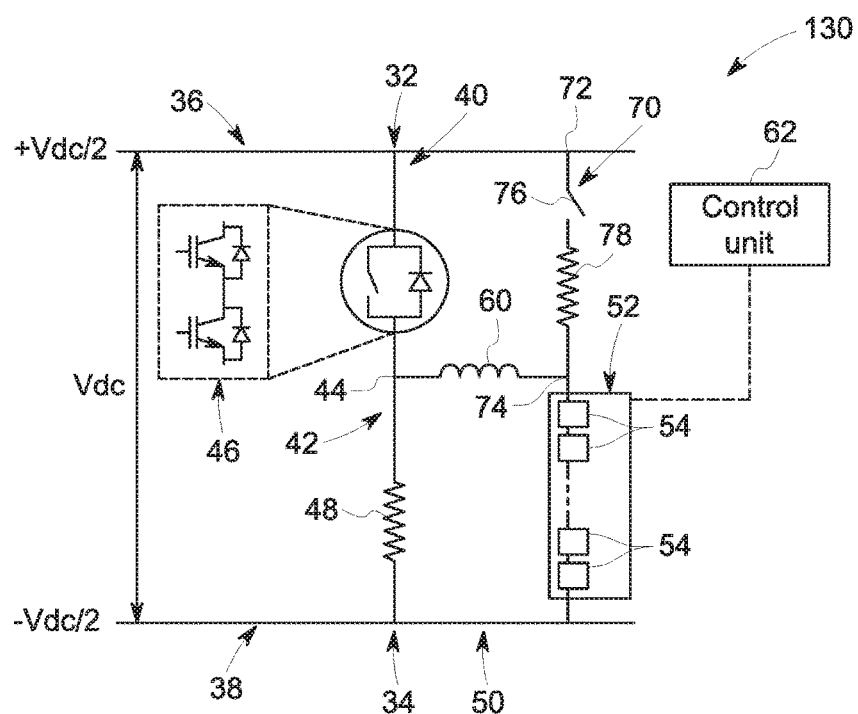
FIG. 5 shows, in schematic form, a control circuit according to a second embodiment of the invention.

A second control circuit 130 according to a second embodiment of the invention is shown in FIG. 5. The second control circuit 130 of FIG. 5 is similar in structure and operation to the first control circuit 30 of FIG. 2, and like features share the same reference numerals.

The second control circuit 130 differs from the first control circuit 30 in that the second control circuit 130 further includes a charging circuit 70.

The charging circuit 70 has first and second auxiliary terminals 72,74. In use, the first auxiliary terminal 72 is connected to the first DC power transmission line 36. The second auxiliary terminal 74 is connected to a junction between the reactor 60 and the chain-link converter 52 such that a branch is formed between the third primary terminal 44 and the second auxiliary terminal 74, the branch including the reactor 60. In this manner the reactor 60 separates the charging circuit 70 and the current transmission path.

The charging circuit 70 includes an auxiliary switching element 76. In use, the auxiliary switching element 76 is switchable to cause a current to flow between the first and second DC power transmission lines 36,38 via the chain-link converter 52. The current flowing between the first and second DC power transmission lines 36,38 via the chain-link converter 52 can be used to charge at least one of the plurality of capacitors 58 in the chain-link converter 52.

The reactor 60 provides control over the flow of current in the current transmission path when the auxiliary switching element 76 is switched to cause a current to flow between the first and second DC power transmission lines 36,38 via the chain-link converter 52.

The charging circuit 70 further includes a resistive element 78 with a higher resistance than the dump resistor 48. The provision of such a resistive element 78 in the charging circuit 70 prevents the flow of high current in the second control circuit 130 when the auxiliary switching element 76 is switched to cause a current to flow between the first and second DC power transmission lines 36,38 via the chain-link converter 52.

The inclusion of the charging circuit 70 in the second control circuit 130 therefore enables charging of each capacitor 58 in the chain-link converter 52 using current from the DC power transmission lines 36,38 even when the first current transmission path portion 40 is switched out of circuit. Using current from the DC power transmission lines 36,38 obviates the need for a separate energy source to charge each capacitor 58 in the chain-link converter 52. The addition of a separate energy source to the second control circuit 130 would have increased the size, weight and cost to the second control circuit 130 and thereby adversely affect the energy and cost efficiency of the second control circuit 130.

In addition the inclusion of the charging circuit 70 in the second control circuit 130 provides direct control over the charging of the capacitors 58 in the chain-link converter 52 prior to its use by the chain-link converter 52 in providing a voltage source, thus improving the reliability of the second control circuit 130. Otherwise omission of the charging circuit 70 from the second control circuit 130 could result in each capacitor 58 in the chain-link converter 52 being in an either uncharged or partially charged state, which in turn could hinder the chain-link converter 52 from providing a voltage source with a required voltage range or level.

The invention claimed is:

1. A control circuit comprising:
   first and second primary terminals for respective connection to first and second power transmission lines;
   a current transmission path extending between the first and second primary terminals and having first and second current transmission path portions separated by a third primary terminal, the first current transmission path portion including at least one primary switching element connected in series between the first and third primary terminals, the second current transmission path portion including an energy conversion block connected between the second and third primary terminals, the energy conversion block including at least one primary energy conversion element for removing energy from the power transmission lines;

a converter limb connected across the second and third primary terminals, the converter limb including a chain-link converter, wherein the chain-link converter includes at least one energy storage device for storing and releasing energy;

a control unit which controls the chain-link converter to selectively provide a voltage source to minimize a voltage across the or each primary switching element prior to switching of the or each primary switching element; and further including a charging circuit having first and second auxiliary terminals, the first auxiliary terminal being connectable to the first power transmission line, the second auxiliary terminal being connected to the chain-link converter, the charging circuit including at least one auxiliary switching element, the or each auxiliary switching element being switchable to cause a current to flow between the first and second power transmission lines via the chain-link converter to charge the or each energy storage device.

2. The control circuit according to claim 1 wherein the first current transmission path portion including a plurality of primary switching elements connected in series between the first and third primary terminals.

3. The control circuit according to claim 1 wherein the chain-link converter includes a plurality of series-connected modules, each module including at least one secondary switching element and at least one energy storage device, the or each secondary switching element and the or each energy storage device in each module combining to selectively provide a voltage source.

4. The control circuit according to claim 1 wherein the converter limb further includes an inductive element connected in series with the chain-link converter.

5. The control circuit according to claim 1 wherein the control unit controls the chain-link converter to provide a variable voltage source in a ramping mode to ramp up or down a voltage across the second current transmission path portion.

6. The control circuit according to claim 1 wherein the control unit controls the chain-link converter to provide a zero voltage source in a bypass mode to permit current to flow in the converter limb while the first current transmission path portion is switched out of circuit.

7. The control circuit according to claim 1 wherein the charging circuit includes a resistive element with a higher resistance than the energy conversion block.

8. The control circuit according to claim 1 wherein the second auxiliary terminal is connected to a junction between the inductive element and the chain-link converter such that a branch is formed between the third primary terminal and the second auxiliary terminal, the branch including the inductive element.

9. The control circuit according to claim 1 wherein the chain-link converter further includes at least one secondary switching element being switchable to selectively control the chain-link converter to provide a voltage source or block the chain-link converter from providing a voltage source.

10. The control circuit according to claim 9 wherein the control unit controls the switching of at least one secondary switching element of the chain-link converter in a blocking mode to block the chain-link converter from providing a voltage source while the or each primary switching element is switched to switch the first current transmission path portion into circuit.

11. The control circuit according to claim 1 wherein the control unit controls the chain-link converter to selectively charge or discharge at least one energy storage device when current flows in the converter limb.

12. The control circuit according to claim 11 wherein the chain-link converter includes at least one secondary switching element, and the control unit controls the switching of the or each secondary switching element of the chain-link converter to selectively charge or discharge at least one energy storage device when current flows in the converter limb.

* * * * *